United States Patent
Savagaonkar et al.

(10) Patent No.: US 9,639,708 B2
(45) Date of Patent: May 2, 2017

(54) METHODS AND SYSTEMS OF ENCRYPTING FILE SYSTEM DIRECTORIES

(71) Applicant: Google Inc., Mountain View, CA (US)

(72) Inventors: Uday Ramesh Savagaonkar, Mountain View, CA (US); Michael Halcrow, Mountain View, CA (US); Theodore Yue Tak Ts'o, Mountain View, CA (US); Ildar Muslukhov, Vancouver (CA)

(73) Assignee: GOOGLE INC., Mountain View, CA (US)

( * ) Notice: Subject to any disclaimer, the term of this patent is extended or adjusted under 35 U.S.C. 154(b) by 55 days.

(21) Appl. No.: 14/829,095

(22) Filed: Aug. 18, 2015

(65) Prior Publication Data
US 2017/0053125 A1    Feb. 23, 2017

(51) Int. Cl.
G06F 12/14 (2006.01)
G06F 21/60 (2013.01)
G06F 21/62 (2013.01)

(52) U.S. Cl.
CPC ........ *G06F 21/6209* (2013.01); *G06F 21/602* (2013.01)

(58) Field of Classification Search
CPC . G06F 12/1408; G06F 2212/402; G06F 21/62
See application file for complete search history.

(56) References Cited

U.S. PATENT DOCUMENTS

| 8,079,065 | B2 | 12/2011 | Sacson et al. |
| 2002/0095590 | A1 | 7/2002 | Douceur et al. |
| 2003/0070071 | A1* | 4/2003 | Riedel ................. G06F 21/6218 713/165 |
| 2008/0154978 | A1 | 6/2008 | Lemar et al. |
| 2014/0068273 | A1 | 3/2014 | Sobel et al. |

OTHER PUBLICATIONS

Chris Hoffman, "Encrypt Your Dropbox Files With BoxCryptor", Feb. 22, 2012, Retrieved from the Internet: http://www.makeuseof.com/tag/encrypt-dropbox-files-boxcryptor/.

* cited by examiner

*Primary Examiner* — Izunna Okeke
(74) *Attorney, Agent, or Firm* — Fox Rothschild LLP

(57) ABSTRACT

An electronic device implements a method of encrypting directories of a file system. A processor receives a request to access a directory entry of a file system, and identifies a user who is logged into the electronic device. The processor determines whether the user has access to a directory encryption key associated with the directory entry and, if not, identifies an encrypted file name stored in the directory entry, and determines whether the encrypted file name complies with one or more naming rules. If the encrypted file name does not comply with one or more naming rules, the processor applies one or more functions to a file name associated with the encrypted file name to generate an encoded encrypted file name that complies with the one or more naming rules, and causes the encoded encrypted file name to be displayed as a representation of the directory entry.

14 Claims, 5 Drawing Sheets

METHODS AND SYSTEMS OF ENCRYPTING FILE SYSTEM DIRECTORIES

BACKGROUND

File encryption technology, such as, for example, ecryptfs, typically provide a file system level encryption scheme by creating a stacked file system on top of an underlying file system. While such stacking isolates such file encryption technology from details of the underlying file system such as, for example, block assignments and directory structures, the stacking also creates performance overheads. In addition, some file encryption technology does not provide integrity protection for file data of file names, and the file name encoding that is used often violates file name length rules which results in userspace application failures.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, an electronic device implements a method of encrypting directories of a file system on the electronic device. Optionally, the file system may be an EXT4 file system. A processor receives from a process running on an electronic device, a request to access a directory entry of a file system, and identifies a user who is logged into the electronic device. Optionally, the processor may identify a user by accessing an electronic record of a user who is logged into the electronic device that is stored on the electronic device.

The processor determines whether the user has access to a directory encryption key associated with the directory entry. Optionally, to determine whether the user has access to the directory encryption key, the processor may access an electronic record to determine whether the directory entry was created by the user.

In response to determining that the user does not have access to the directory encryption key, the processor identifies an encrypted file name stored in the directory entry, where the encrypted file name includes an encrypted user-domain file name and determines whether the encrypted file name complies with one or more naming rules. Optionally, the processor may determine whether the encrypted file name complies with one or more naming rules by determining whether a length of the encrypted file name is exceeds a threshold value. In response to determining that the encrypted file name does not comply with one or more naming rules, the processor applies one or more functions to a file name associated with the encrypted file name to generate an encoded encrypted file name that complies with the one or more naming rules. Optionally, the processor may apply a cryptographic hash to the file name to generate a first value, and may encode the first value. Alternatively, the processor may apply a hash function to the file name to generate a first value, and concatenate the first value and at least a portion of the file name.

The processor causes the encoded encrypted file name to be displayed via a user interface of the electronic device as a representation of the directory entry.

In an embodiment, an electronic device may implement a method of encrypting directories of a file system on the electronic device. Optionally, the file system may be an EXT4 file system. A processor receives from a process running on the electronic device, a request to access a directory entry of the file system, and the processor identifies a user who is logged into the electronic device. Optionally, the processor may identify a user by accessing an electronic record of a user who is logged into the electronic device that is stored on the electronic device.

The processor determines whether the user has access to a directory encryption key associated with the directory entry. Optionally, the processor may determine whether the user has access to a directory encryption key by accessing an electronic record to determine whether the directory entry was created by the user.

In response to determining that the user does not have access to the directory encryption key, the processor identifies an encrypted file name stored in the directory entry, where the encrypted file name includes an encrypted user-domain file name, and determines whether the encrypted file name complies with one or more naming rules. In response to determining that the encrypted file name complies with one or more naming rules, the processor encodes the encrypted file name, and causes the encoded encrypted file name to be displayed via a user interface of the electronic device as a representation of the directory entry.

In an embodiment, an electronic device may implement a method of determining an access hash value for an encrypted file directory. A processor identifies an encrypted file name stored in a directory entry, where the encrypted file name includes an encrypted user-domain file name. The processor determines whether the encrypted file name complies with one or more naming rules. In response to determining that the encrypted file name does not comply with one or more naming rules, the processor applies one or more functions to a file name associated with the encrypted file name to generate an access hash value for the directory entry, and stores the access hash value in a directory indexing structure such that it is associated with the directory entry.

In an embodiment, a processor of an electronic device receives from a process running on the processor, an argument representing a file name of a file and determines whether a user who is logged into the electronic device has access to a directory encryption key associated with a directory associated with the file. In response to determining that the user has access to the directory encryption key, the processor determines that the argument is a plaintext representation of the file name, encrypts the argument using the directory encryption key to create an encrypted file name, encodes the encrypted file name to generate an access hash value, uses the access hash value to identify the file from an index structure, and causes the operation to be performed on the identified file.

In an embodiment, a processor of an electronic device receives from a process running on the processor, an argument representing a file name of a file, and determines whether a user who is logged into the electronic device has access to a directory encryption key associated with a directory associated with the file. In response to determining that the user does not have access to the directory encryption key, the processor generates an access hash value using the argument, uses the access hash value to identify the file from an index structure, and causes the operation to be performed on the identified file.

DETAILED DESCRIPTION

Figure 1:
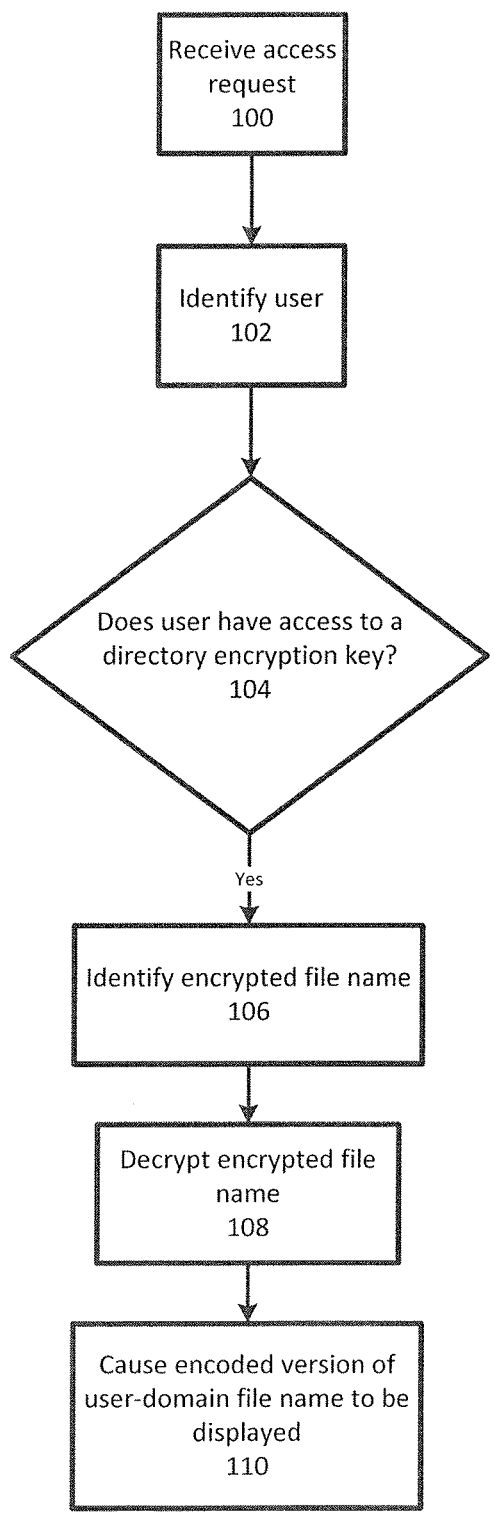
FIG. 1 illustrates an example method of accessing encrypted directories of a file system on an electronic device according to an embodiment.

The following terms shall have, for purposes of this application, the respective meanings set forth below:

A "directory encryption key" refers to a cryptographic key that is used to encrypt the contents of one or more directories of an account.

A "directory indexing structure" refers to a data structure having one or more entries that is used for directory indexing. Example directory indexing structures may include, without limitation, files, trees and/or the like.

An "electronic device" refers to a device that includes a processor and non-transitory, computer-readable storage medium. The memory may contain programming instructions that, when executed by the processor, cause the electronic device to perform one or more operations according to the programming instructions. Examples of electronic devices include personal computers, servers, mainframes, gaming systems, televisions, and portable electronic devices such as smartphones, personal digital assistants, cameras, tablet computers, laptop computers, media players and the like. When used in the claims, reference to "an electronic device", "processor", or "processing device" may include a single device, or it may refer to any number of devices having one or more processors that communicate with each other and share data and/or instructions to perform the claimed steps. When used in the claims, reference to "memory" or "computer-readable storage medium" may include a single memory device or medium, or it may refer to any number of memory devices or computer-readable storage media.

An "encrypted file name" refers to one or more encrypted character strings such as, for example, ciphertext, that are used to locate one or more directory entries corresponding to one or more files in a directory. For example, an encrypted file name may be an encrypted user-domain file name.

A "user-domain file name" refers to one or more character strings such as, for example, plaintext, that are used as a mnemonic to uniquely identify a file in a directory.

This disclosure generally relates to a file system level encryption scheme for encrypting directories and/or file names. Certain electronic devices, such as, for example, notebooks or tablets, may allow multiple users to create separate accounts on the electronic device. Each user may have certain permissions and privileges which define the information that the user is able to access when the user is logged in to the user's account on the electronic device. Different directories may be owned by different owners, and an owner of a directory may have access to the corresponding directory encryption key. On occasion, a privileged user, such as, for example, an administrative process, may delete files from a user's directory such as, for example, to free up disk space. While these users may be allowed to delete files, they may not be permitted to decipher the file names.

In certain embodiments, an encryption scheme as described in this disclosure may meet certain requirements. For instance, under an encryption scheme, only users who have access to a directory encryption key may be allowed to create new directory entries in a directory. For example, User A and User B may both have accounts on a single notebook computer. By logging into his account, User A may have access to a directory encryption key associated with one or more directories for his account. Similarly, by logging into her account, User B may have access to a directory encryption key associated with one or more directories for her account. However, when User A is logged into his account, he does not have access to User B's directory encryption key, and vice versa.

Another requirement may be that any user of an electronic device who has permission to access an encrypted directory may be able to view the contents of the directory regardless of whether the user has access to a corresponding directory encryption key for the directory. A user may have permission to access an encrypted directory via a discretionary access control (DAC) permission. For instance, referring back to the above example, User A may specify, through a DAC permission, that User B is allowed to access Directory X. Even though User B does not have access to User A's directory encryption key, User B may, because of the DAC permission, be able to view the contents of Directory X.

In certain embodiments, an electronic device may encode one or more file names of files in a directory and cause the encoded file names to be displayed to a user who does not have access to a director encryption key. However, for a user who does have access to a directory encryption key, an electronic device may cause one or more clear-text or plaintext file names to be displayed to the user. For instance, referring to the above example, User B may be able to access Directory X. However, an electronic device may cause the file names in Directory X to be displayed to User B in an encoded form. The electronic device may cause the file names in Directory X to be displayed in their plaintext form to User A, however, as User A has access to the directory encryption key for Directory X.

In various embodiments, a directory listing that is displayed to any user, regardless of whether the user has access to the directory encryption key for the directory, may be Portable Operating System Interface (POSIX) compliant. POSIX is a group of standards for maintaining compatibility between operating systems. This means that, for example, a displayed file name must uniquely identify a directory entry, file names listed with or without access to a directory encryption key must be legal file names for the corresponding file system. For example, in an EXT4 file system, the number of characters in a file name must not exceed a certain threshold value (e.g., 255 characters), and/or file names must not include a null value ('\0') or a '/' character. Additional and/or alternate requirements may be used within the scope of this disclosure for a directory to be POSIX compliant.

Another example of a requirement may be that users who have access to the directory encryption key for a directory may be able to perform all operations on the directory that they are allowed by, for example, the DAC policy for the directory. As another example, users who do not have access to the directory encryption key for a directory may only be allowed to view the contents of the directory in encoded form, and delete files from the directory, if these operations are allowed by the DAC policy for the directory. An electronic device may prohibit a user who does not have access to a directory encryption key from performing any other operations, such as, for example, creating new files in the directory, even if these operations are allowed by the DAC policy.

FIG. 1 illustrates an example method of accessing encrypted directories of a file system on an electronic device according to an embodiment. As illustrated by FIG. 1, an electronic device may receive 100 a request to access a directory entry of a file system located on the electronic device. In an embodiment, an electronic device may receive 100 a request to access a directory entry from a process running on the electronic device.

An electronic device may identify 102 a user who is logged into the electronic device. For example, an electronic device may identify 102 a user who is logged into the electronic device when the request is received. In an embodiment, an electronic device may maintain an electronic record of a current user in a database, a list, or other data structure. As such, an electronic device may identify 102 a user who is logged into the electronic device by accessing one or more electronic records of such data structure.

In an embodiment, an electronic device may determine 104 whether the identified user has access to a directory encryption key associated with the directory corresponding to the directory entry for which access is being requested. For instance, a user who is logged into an account on an electronic device may have access to a directory encryption key for one or more directories that have been created under the account. An electronic device may maintain an electronic record of which user is currently logged into the electronic device and/or one or more records of which directories were created under which user's account. An electronic record may be a database entry, a table entry or other data structure entry. For instance, an electronic device may maintain a database with an entry indicating that Directory A and Directory B were created under User A's account. If the electronic device determines from one or more electronic records that User A is currently logged into his or her account on the electronic device, the electronic device may determine 104 that User A has access to the directory encryption key for Directory A and Directory B. However, if the electronic device determines that a user other than User A is currently logged into an account on the electronic device, the electronic device may determine 104 that the user does not have access to the directory encryption key for Directory A and Directory B.

In another embodiment, an electronic device may not have access to a directory encryption key associated with a user who is not logged into the electronic device. For instance, a directory encryption key may be derived from one or more access credentials for an electronic device such as, for example, a password, a pass-phrase and/or the like. If a user is not logged into the electronic device, the electronic device may not have access to a directory key associated with the user.

Figure 2:
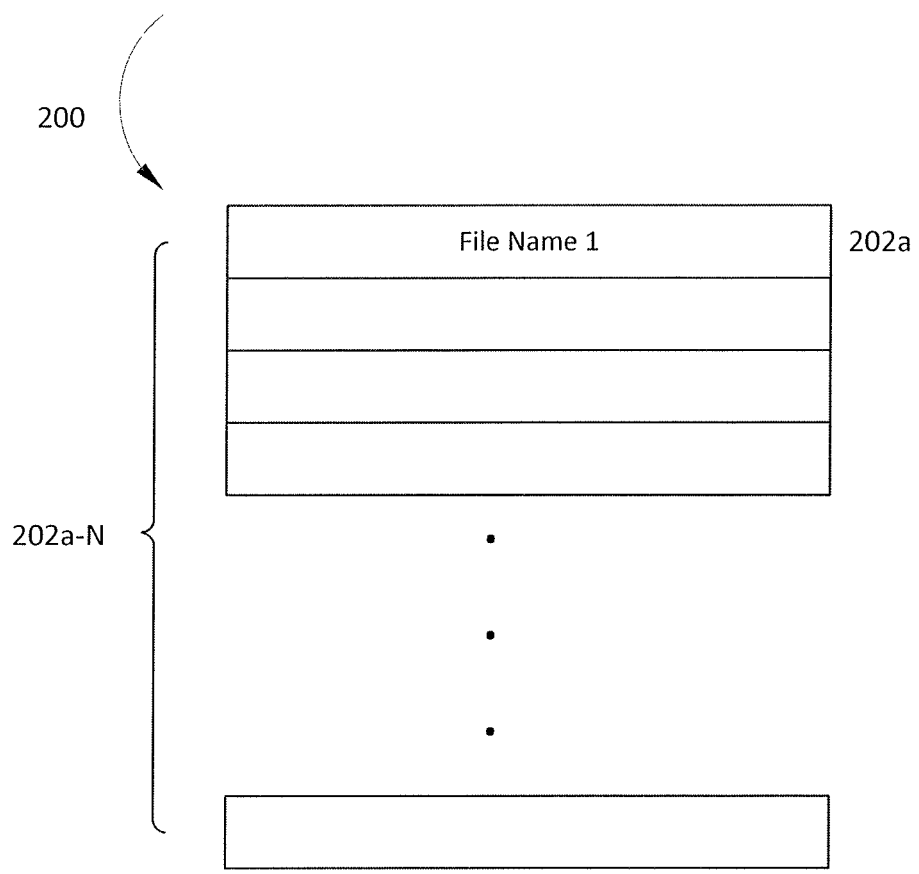
FIG. 2 illustrates an example directory structure according to an embodiment.

FIG. 2 illustrates an example directory structure according to an embodiment. As illustrated by FIG. 2, a directory 200 may include one or more directory entries 202a-N. Each directory entry 202a-N may include one or more user-domain file names. A user-domain file name refers to one or more character strings that are used as a mnemonic to uniquely identify a file in a directory. In an embodiment, a user-domain file name may include plaintext. For example, as illustrated by FIG. 2, directory entry 202a includes the user-domain file name "File Name 1." A user-domain file name may include one or more ASCII character strings. In some embodiments, a user-domain file name may be specified by a user. For example, when a user creates a new directory, the user may specify the user-domain file name that corresponds to the new directory. Alternatively, an electronic device may determine a user-domain file name for a directory. For instance, an electronic device may assign a default or random user-name file name to a created directory.

In various embodiments, one or more directory entries may include an encrypted file name. An encrypted file name refers to one or more encrypted character strings, such as, for example, ciphertext, that are used to locate one or more directory entries corresponding to one or more files. In an embodiment, an encrypted file name may be stored in a directory entry. When an electronic device creates a directory entry in an encrypted directory, the electronic device may encrypt the user-domain file name associated with the directory entry to generate the encrypted file name.

Referring back to FIG. 1, in an embodiment, in response to determining 104 that an identified user has access to a directory encryption key associated with the directory corresponding to the directory entry for which access is being requested, an electronic device may identify 106 an encrypted file name associated with the directory entry. In an embodiment, an electronic device may identify 106 an encrypted file name by retrieving an encrypted file name from a directory entry.

In an embodiment, an electronic device may decrypt 108 the identified encrypted file name. An electronic device may cause the decrypted encrypted file name to be displayed via a user interface of the electronic device. For instance, an electronic device may send one or more instructions to a user interface or display device to display the decrypted encrypted file name. Since an encrypted file name may be an encrypted version of a user-domain file name, decrypting an encrypted file name may yield the user-domain file name.

Figure 3:
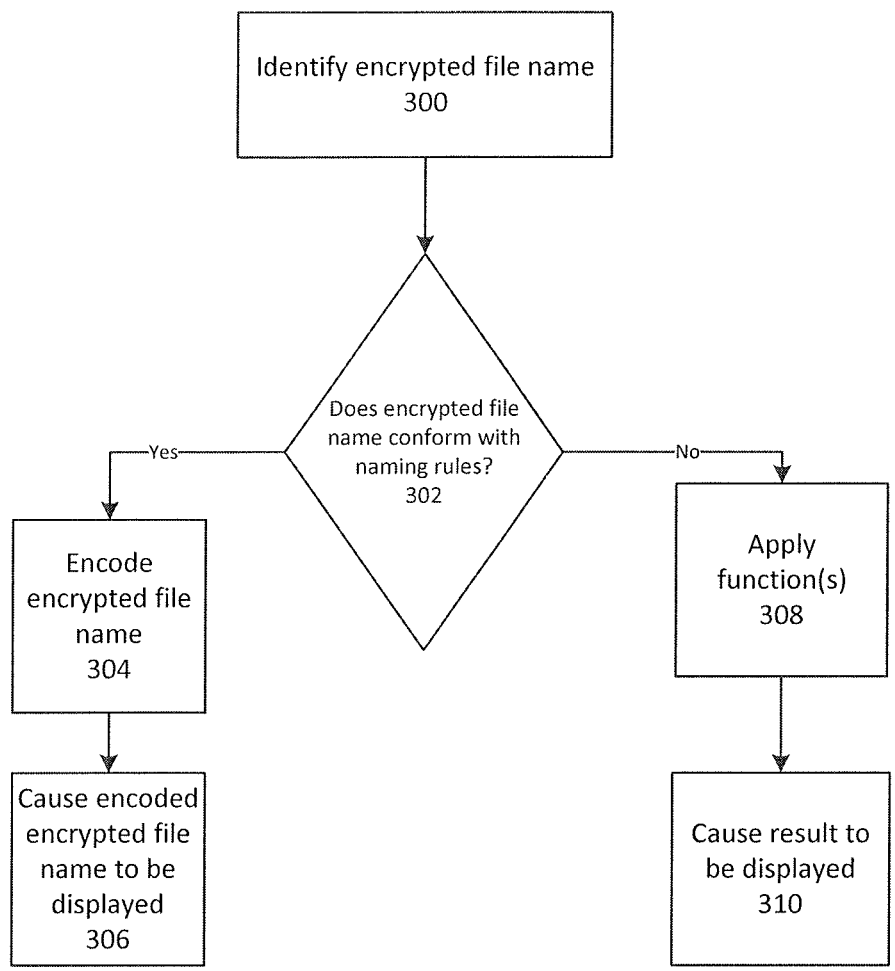
FIG. 3 illustrates a flow chart of an example method of causing an encoded version of a user-domain file name to be displayed according to an embodiment.

In an embodiment, an electronic device may cause an encoded version of a user-domain file name to be displayed via a user interface. For example, in response to determining 104 that an identified user does not have access to a directory encryption key associated with a directory corresponding to the directory entry for which access is being requested, an electronic device may cause 110 an encoded version a user-domain file name to be displayed. FIG. 3 illustrates a flow chart of an example method of causing 110 an encoded version a user-domain file name to be displayed according to an embodiment.

As illustrated by FIG. 3, an electronic device may identify 300 an encrypted file name associated with a directory entry. In an embodiment, an electronic device may identify 300 an encrypted file name by retrieving an encrypted file name from a directory entry.

In an embodiment, an electronic device may determine 302 whether the identified encrypted file name conforms to one or more file system naming rules, conventions or other requirements. For instance, an encrypted file name may have size restrictions and its size may not exceed a certain length such as, for instance, 32 bytes. Additional and/or alternate rules or requirements may be used within the scope of this disclosure.

If an electronic device determines 302 that an encrypted file name conforms to one or more naming rules, an electronic device may encode 304 the encrypted file name, and may cause 306 the encoded encrypted file name to be displayed. For example, in an embodiment, an electronic device may encode an encrypted file name value using a set of characters. A set of characters may be an alphanumerical set of characters, ASCII characters and/or the like.

In certain embodiments, if an electronic device determines 302 that an encrypted file name does not conform to one or more naming rules, an electronic device may apply 308 one or more functions to the file name to generate an encoded version of the file name that conforms to one or more naming rules. In an embodiment, a function may be a hash function, a cryptographic hash function, encoding and/or the like. For example, a function may involve running a cryptographic hash over a file name and then encoding the cryptographic hash. As another example, the ext4_dirhash function may be applied to a file name, and, in some embodiments, the result may be concatenated with one or more characters such as, for example, a portion of the file name, such as for instance, the last 16 bytes of the file name, a prefix and/or the like.

In an embodiment, an electronic device may cause 310 an encoded version of a file name that is the result of applying 308 one or more functions to the file name to be displayed to a user via a user interface of the electronic device.

In certain embodiments, one or more cryptographic hashes of file names may be used to access a directory indexing structure. Certain file systems such as, for example EXT4, implements indexed directories. In an indexed directory, a certain file may be searched using a directory indexing structure. A directory indexing structure may include a listing of directories, files and/or the like. For instance, EXT4 implements a directory indexing structure called a hash tree (HTree).

In an embodiment, a file system may compute an index structure access hash value for a particular file regardless of whether a user has access to a directory encryption key or not. An index structure access hash value may be used to search for files in a directory. In an embodiment, an index structure access hash value may be used to complete a readdir operation. Since the layout of a directory index structure may be based on an index structure access hash, a given directory entry may result in a fixed index structure access hash value, regardless of whether a user has access to a directory encryption key. If a user does not have access to a directory encryption key, an encoded cryptographic hash of the file name's ciphertext may act a file name, and the user may perform a directory search using the encoded representation.

Figure 4:
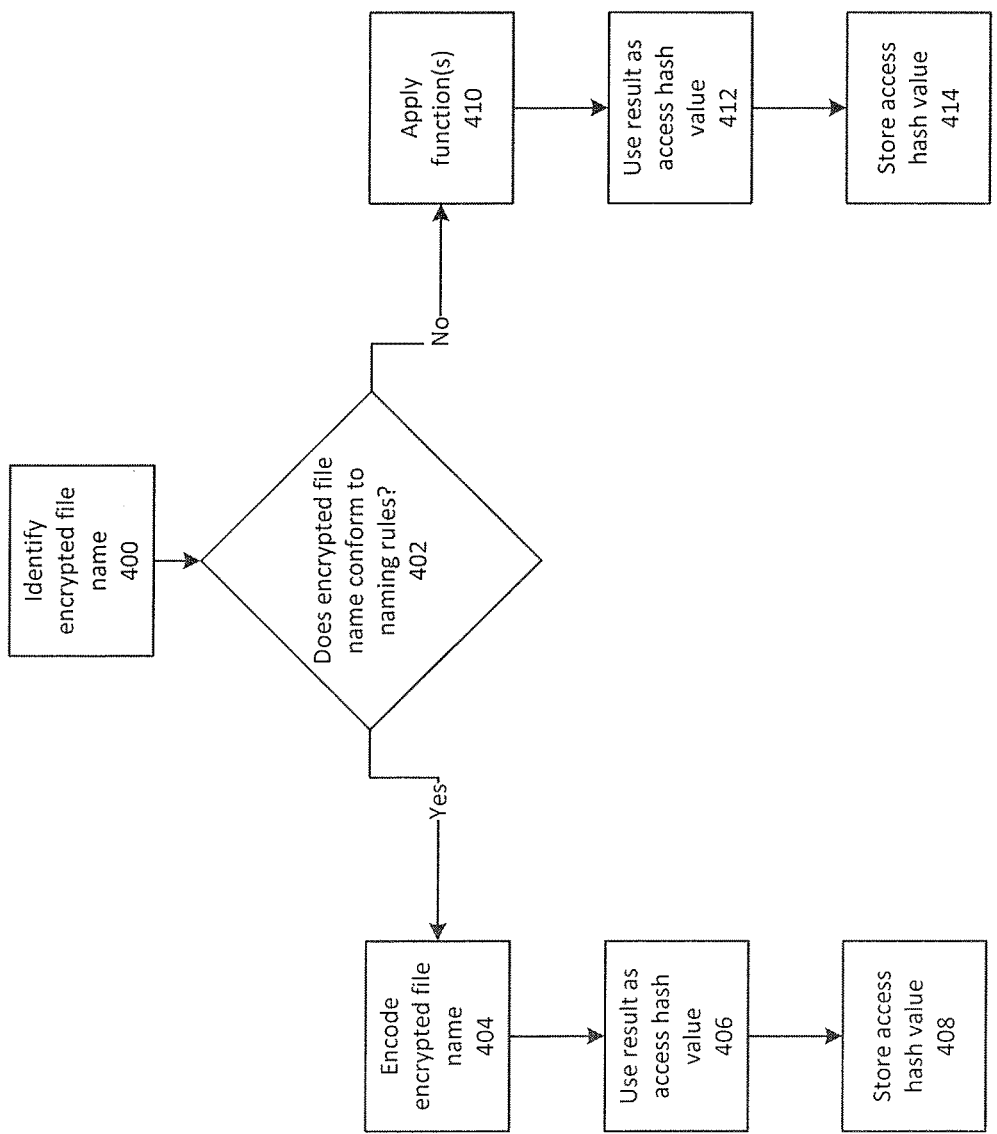
FIG. 4 illustrates an example method of determining an access hash value according to an embodiment.

In an embodiment, an electronic device may generate an access hash value for a file name by determining an encoded value for the file name. In certain embodiments, an electronic device may determine an encoded value for a file name in a manner similar to that described above with respect to determining an encoded version of a file name when a user does not have access to a directory encryption key. FIG. 4 illustrates an example method of determining an access hash value according to an embodiment.

As illustrated by FIG. 4, an electronic device may identify 400 an encrypted file name associated with a directory entry. In an embodiment, an electronic device may identify 400 an encrypted file name by retrieving an encrypted file name from a directory entry.

In an embodiment, an electronic device may determine 402 whether the identified encrypted file name conforms to one or more file system naming rules, conventions or other requirements. For instance, an encrypted file name may have size restrictions and its size may not exceed a certain length such as, for instance, 32 bytes. Additional and/or alternate rules or requirements may be used within the scope of this disclosure.

If an electronic device determines 402 that an encrypted file name conforms to one or more naming rules, an electronic device may encode 404 the encrypted file name, and may use 406 the encoded encrypted file name as the access hash value for the file name. For example, in an embodiment, an electronic device may encode an encrypted file name using a set of characters. A set of characters may be an alphanumerical set of characters, ASCII characters and/or the like. In some embodiments, an electronic device may store 408 an access hash value in a directory indexing structure as a representation of the file.

In certain embodiments, if an electronic device determines 402 that an encrypted file name does not conform to one or more naming rules, an electronic device may apply 410 one or more functions to the file name to generate an encoded version of the file name that conforms to one or more naming rules. In an embodiment, a function may be a hash function, a cryptographic hash function, encoding and/or the like. For example, a function may involve running a cryptgraphic hash over a file name and then encoding the cryptographic hash. As another example, the ext4_dirhash function may be applied to a file name, and, in some embodiments, the result may be concatenated with one or more characters such as, for example, a portion of the file name, such as for instance, the last 16 bytes of the file name, a prefix and/or the like.

In an embodiment, an electronic device may use 412 an encoded version of a file name that is the result of applying 410 one or more functions to the file name as an access hash value for the file name. In some embodiments, an electronic device may store 414 an access hash value in a directory indexing structure as a representation of the file.

In various embodiments, a file system may receive from a process that is running an argument representing a file name of a particular file. Example processes may include, without limitation, stat( ), open( ), or unlink( ) among others. However, the argument that is received may depend on whether a user has access to a directory encryption key for the particular file. For example, if a user has access to a directory encryption key, the argument may include the plaintext representation name of the file. However, if the user does not have access to a directory encryption key, the argument may include an encoded representation of the file name. A file system may need to translate an argument based on the situation to determine the referenced file name.

If a file system determines that a user does not have access to a directory encryption key for a particular file, the file system may determine that the argument is an encoded version of the cipher text of the file name. The file system may use this encoded version to directly generate an access hash value. The file system may use the generated access hash value to identify the corresponding file from an index structure, and may cause the process to be applied to the identified file. An access hash value may be generated as described throughout this disclosure.

If a file system determines that a user has access to a directory encryption key for a particular file, the file system may determine that what has been provided is a plaintext representation of the file name. The file system may use the directory encryption key to encrypt the plaintext representation to create an encrypted file name, and may encode the encrypted file name. The file system may generate an access hash value using the encoded encrypted file name, and may use the generated access hash value to identify the corresponding file from an index structure. The file system may cause the process to be applied to the identified file.

Figure 5:
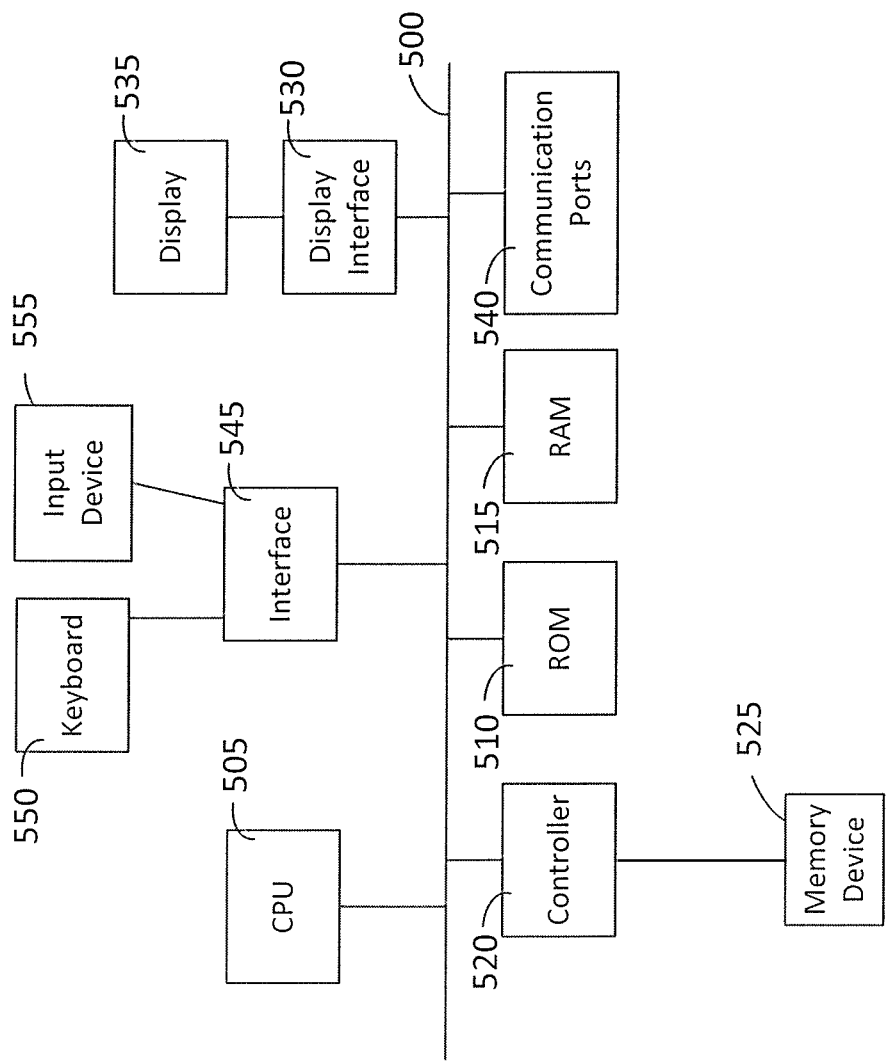
FIG. 5 illustrates a block diagram of example hardware that may be used to contain or implement program instructions according to an embodiment.

FIG. 5 depicts a block diagram of hardware that may be used to contain or implement program instructions. A bus 500 serves as the main information highway interconnecting the other illustrated components of the hardware. CPU 505 is the central processing unit of the system, performing calculations and logic operations required to execute a program. CPU 505, alone or in conjunction with one or more of the other elements disclosed in FIG. 5, is an example of a production device, computing device or processor as such terms are used within this disclosure. Read only memory (ROM) 510 and random access memory (RAM) 515 constitute examples of non-transitory computer-readable storage media.

A controller 520 interfaces with one or more optional non-transitory computer-readable storage media 525 to the system bus 500. These storage media 525 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 510 and/or the RAM 515. Optionally, the program instructions may be stored on a tangible, non-transitory computer-readable medium such as a compact disk, a digital disk, flash memory, a memory card, a USB drive, an optical disc storage medium and/or other recording medium.

An optional display interface 530 may permit information from the bus 500 to be displayed on the display 535 in audio, visual, graphic or alphanumeric format. Communication with external devices, such as a printing device, may occur using various communication ports 540. A communication port 540 may be attached to a communication network, such as the Internet or an intranet.

The hardware may also include an interface 545 which allows for receipt of data from input devices such as a keyboard 550 or other input device 555 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of encrypting directories of a file system on an electronic device, the method comprising:
by a processor:
receiving, from a process running on an electronic device, a request to access a directory entry of a file system;
identifying a user who is logged into the electronic device;
determining whether the user has access to a directory encryption key associated with the directory entry, and
in response to determining that the user does not have access to the directory encryption key:
identifying an encrypted file name stored in the directory entry, wherein the encrypted file name comprises an encrypted user-domain file name,
determining whether the encrypted file name complies with one or more naming rules,
in response to determining that the encrypted file name does not comply with one or more naming rules, applying one or more functions to a file name associated with the encrypted file name to generate an encoded encrypted file name that complies with the one or more naming rules and an access hash value for the directory entry,
storing the access hash value in a directory indexing structure such that it is associated with the directory entry, and
causing the encoded encrypted file name to be displayed via a user interface of the electronic device as a representation of the directory entry.

2. The method of claim 1, wherein determining whether the encrypted file name complies with one or more naming rules comprises determining whether a length of the encrypted file name exceeds a threshold value.

3. The method of claim 1, wherein the file system comprises an EXT4 file system.

4. The method of claim 1, wherein identifying a user who is logged into the electronic device comprises accessing an electronic record of a user who is logged into the electronic device that is stored on the electronic device.

5. The method of claim 1, wherein determining whether the user has access to a directory encryption key associated with the directory entry comprises accessing an electronic record to determine whether the directory entry was created by the user.

6. The method of claim 1, wherein applying one or more functions to a file name associated with the encrypted file name to generate an encoded encrypted file name comprises:
applying a cryptographic hash to the file name to generate a first value; and
encoding the first value.

7. The method of claim 1, wherein applying one or more functions to a file name associated with the encrypted file name to generate an encoded encrypted file name comprises:
applying a hash function to the file name to generate a first value;
concatenating the first value and at least a portion of the file name.

8. A system of encrypting directories of a file system on an electronic device, the system comprising:
an electronic device; and
a non-transitory computer-readable storage medium comprising one or more programming instructions that are configured to instruct the electronic device to:
receive, from a process running on an electronic device, a request to access a directory entry of a file system,
identify a user who is logged into the electronic device,
determine whether the user has access to a directory encryption key associated with the directory entry, and
in response to determining that the user does not have access to the directory encryption key:
identify an encrypted file name stored in the directory entry, wherein the encrypted file name comprises an encrypted user-domain file name,
determine whether the encrypted file name complies with one or more naming rules, in response to determining that the encrypted file name does not comply with one or more naming rules, apply one or more functions to a file name associated with the encrypted file name to generate an encoded encrypted file name that complies with the one or more naming rules and an access hash value for the directory entry, storing the access hash value in a directory indexing structure such that it is associated with the directory entry, and cause the encoded encrypted file name to be displayed via a user interface of the electronic device as a representation of the directory entry.

9. The system of claim 8, wherein the one or more programming instructions that are configured to instruct the electronic device to determine whether the encrypted file name complies with one or more naming rules comprise one or more programming instructions that are configured to instruct the electronic device to determine whether a length of the encrypted file name exceeds a threshold value.

10. The system of claim 8, wherein the one or more programming instructions that are configured to instruct the electronic device to determine whether the user has access to a directory encryption key associated with the directory entry comprise one or more programming instructions that are configured to instruct the electronic device to access an electronic record to determine whether the directory entry was created by the user.

11. The system of claim 8, wherein the one or more programming instructions that are configured to instruct the electronic device to apply one or more functions to a file name associated with the encrypted file name to generate an encoded encrypted file name comprise one or more programming instructions that are configured to instruct the electronic device to:

apply a cryptographic hash to the file name to generate a first value; and encode the first value.

12. The system of claim 8, wherein the one or more programming instructions that are configured to instruct the electronic device to apply one or more functions to a file name associated with the encrypted file name to generate an encoded encrypted file name comprise one or more programming instructions that are configured to instruct the electronic device to:

apply a hash function to the file name to generate a first value;

concatenate the first value and at least a portion of the file name.

13. The method of claim 1, wherein:

receiving a request to access a directory entry of a file system comprises receiving an argument representing a file name, applying one or more functions to a file name associated with the encrypted file name to generate an encoded encrypted file name that complies with the one or more naming rules and an access hash value for the directory entry comprises:

generating the access hash value using the argument, using the access hash value to identify the file from the directory indexing structure, and causing an operation to be performed on the identified file.

14. The system of claim 8, wherein:

the one or more programming instructions that are configured to instruct the electronic device to receive a request to access a directory entry of a file system comprise one or more programming instructions that are configured to instruct the electronic device to receive an argument representing a file name of a file, the one or more programming instructions that are configured to instruct the electronic device to apply one or more functions to a file name associated with the encrypted file name to generate an encoded encrypted file name that complies with the one or more naming rules and an access hash value for the directory entry comprise one or more programming instructions that are configured to instruct the electronic device to:

generate the access hash value using the argument, use the access hash value to identify the file from the directory indexing structure, and cause an operation to be performed on the identified file.

* * * * *